Figure 1:
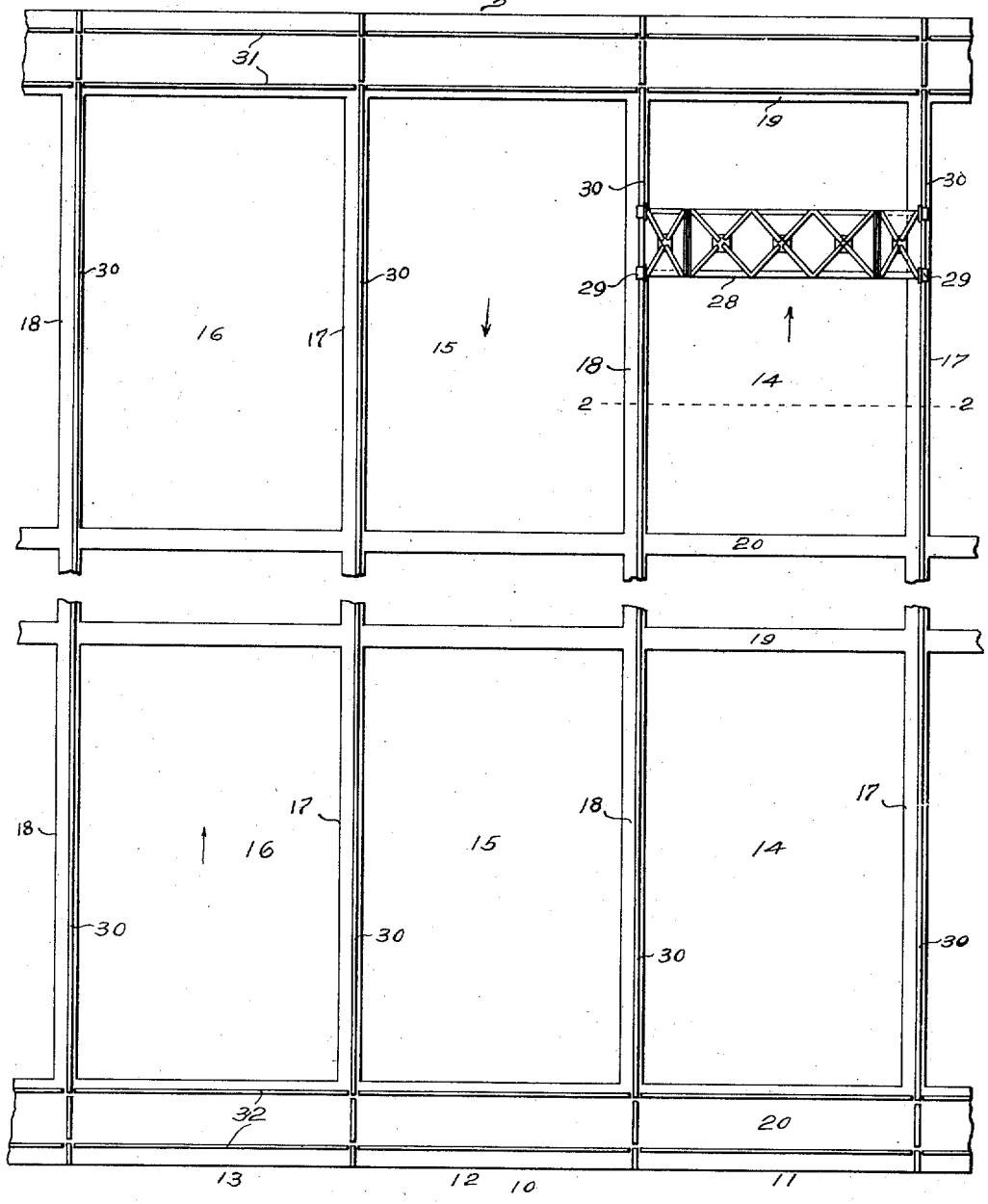

No. 12,488. REISSUED MAY 22, 1906.

H. W. BLAISDELL.

APPARATUS FOR CLEANING FILTER BEDS.

APPLICATION FILED SEPT. 29, 1903.

4 SHEETS—SHEET 1.

WITNESSES:

Mrs G. Pates

W. A. Palmer

INVENTOR

Hiram Wheeler Blaisdell

BY

Charles S. Rogers his ATTORNEY

ANDREW. B. GRAHAM CO., PHOTO-LITHOGRAPHERS, WASHINGTON, D. C.

No. 12,488. REISSUED MAY 22, 1906.

H. W. BLAISDELL.

APPARATUS FOR CLEANING FILTER BEDS.

APPLICATION FILED SEPT. 29, 1903.

4 SHEETS—SHEET 2.

WITNESSES:

Mru G. Oates

W. A. Salmon

INVENTOR

Hiram Wheeler Blaisdell

BY

Charles L. Rogers his ATTORNEY

ANDREW B. GRAHAM CO., PHOTO-LITHOGRAPHERS, WASHINGTON, D. C.

No. 12,488. REISSUED MAY 22, 1906.

H. W. BLAISDELL.

APPARATUS FOR CLEANING FILTER BEDS.

APPLICATION FILED SEPT. 29, 1903.

4 SHEETS—SHEET 3.

WITNESSES:

Mrs G. Cates.

A. Adelmann.

Hiram Wheeler Blaisdell INVENTOR

BY

Charles L. Rogers ATTORNEY

ANDREW B. GRAHAM CO., PHOTO-LITHOGRAPHERS, WASHINGTON, D. C.

No. 12,488. REISSUED MAY 22, 1906.

H. W. BLAISDELL.

APPARATUS FOR CLEANING FILTER BEDS.

APPLICATION FILED SEPT. 29, 1903.

4 SHEETS—SHEET 4.

WITNESSES:

Mu. G. Oates.

A. L. Salmon.

INVENTOR

Hiram Wheeler Blaisdell

BY

Charles S. Rogers his ATTORNEY.

ANDREW B. GRAHAM CO., PHOTO-LITHOGRAPHERS, WASHINGTON, D. C.

UNITED STATES PATENT OFFICE.

HIRAM WHEELER BLAISDELL, OF LOS ANGELES, CALIFORNIA, ASSIGNOR TO BLAISDELL FILTRATION COMPANY, OF LOS ANGELES, CALIFORNIA, A CORPORATION OF CALIFORNIA.

APPARATUS FOR CLEANING FILTER-BEDS.

No. 12,488. Specification of Reissued Letters Patent. Reissued May 22, 1906.

Original No. 729,722, dated June 2, 1903. Application for reissue filed September 29, 1903. Serial No. 175,094.

*To all whom it may concern:*

Be it known that I, HIRAM WHEELER BLAISDELL, a citizen of the United States, residing at Los Angeles, in the county of Los Angeles and State of California, have invented certain new and useful Improvements in Apparatus for Cleaning Filter-Beds; and I do hereby declare the following to be a full, clear, and exact description of the invention, such as will enable others skilled in the art to which it appertains to make and use the same.

This invention relates to improvements for cleaning the material of the beds of filters used in purifying the supply of water to cities, towns, and for other purposes, and particularly for use in connection with filter-beds which are laid out in a plurality of rows inclosed by walls running longitudinally and transversely of such rows, said beds being usually composed of sand; and some of the objects of this invention are to provide an apparatus of this general character which will be simple in construction and positive and efficient in operation.

Another object of this invention is to provide means for transferring the cleaning apparatus from one row of filter-beds to another row, whereby one apparatus can be made to do the work for a plurality of rows of filter-beds.

With these and other objects in view the invention consists, essentially, in the construction, combination, and arrangement of parts substantially as more fully described in the following specification and as illustrated in the accompanying drawings, forming part of this application, in which—

Figure 2:
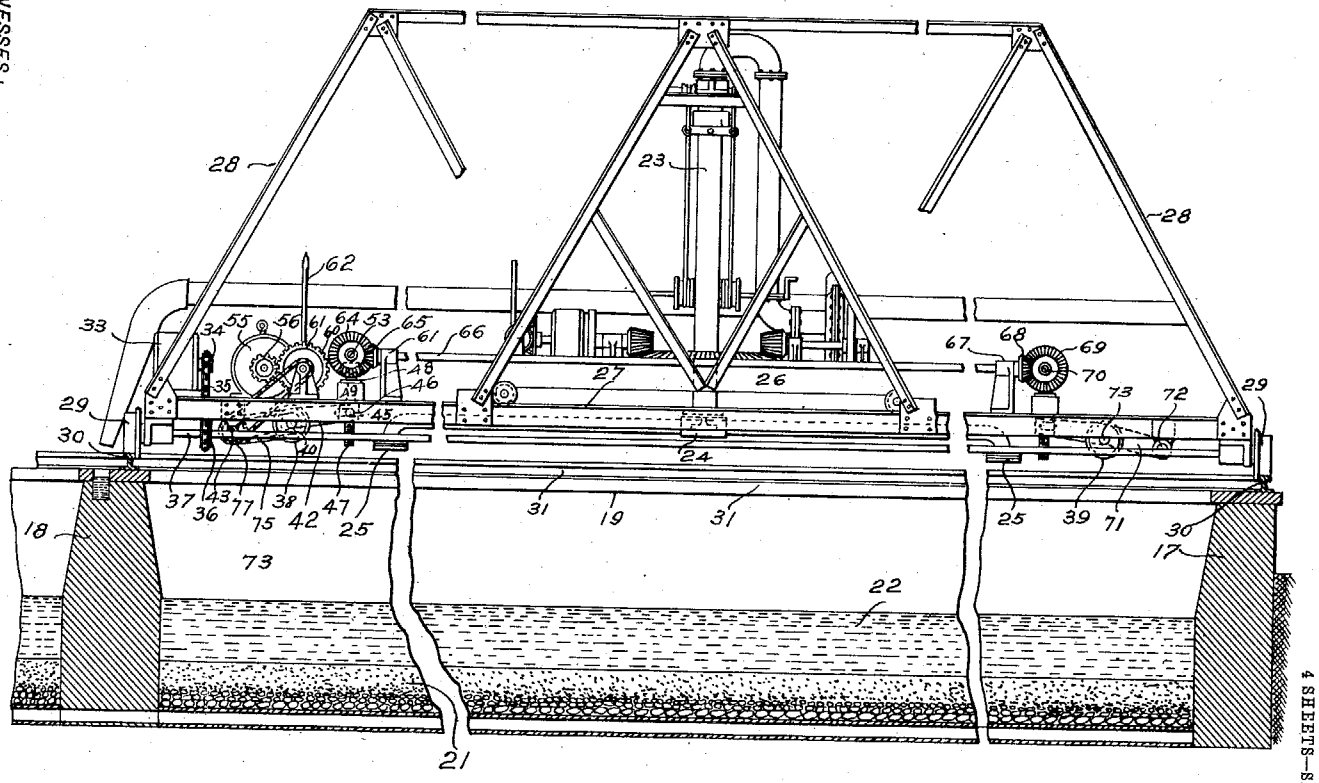
Figure 3:
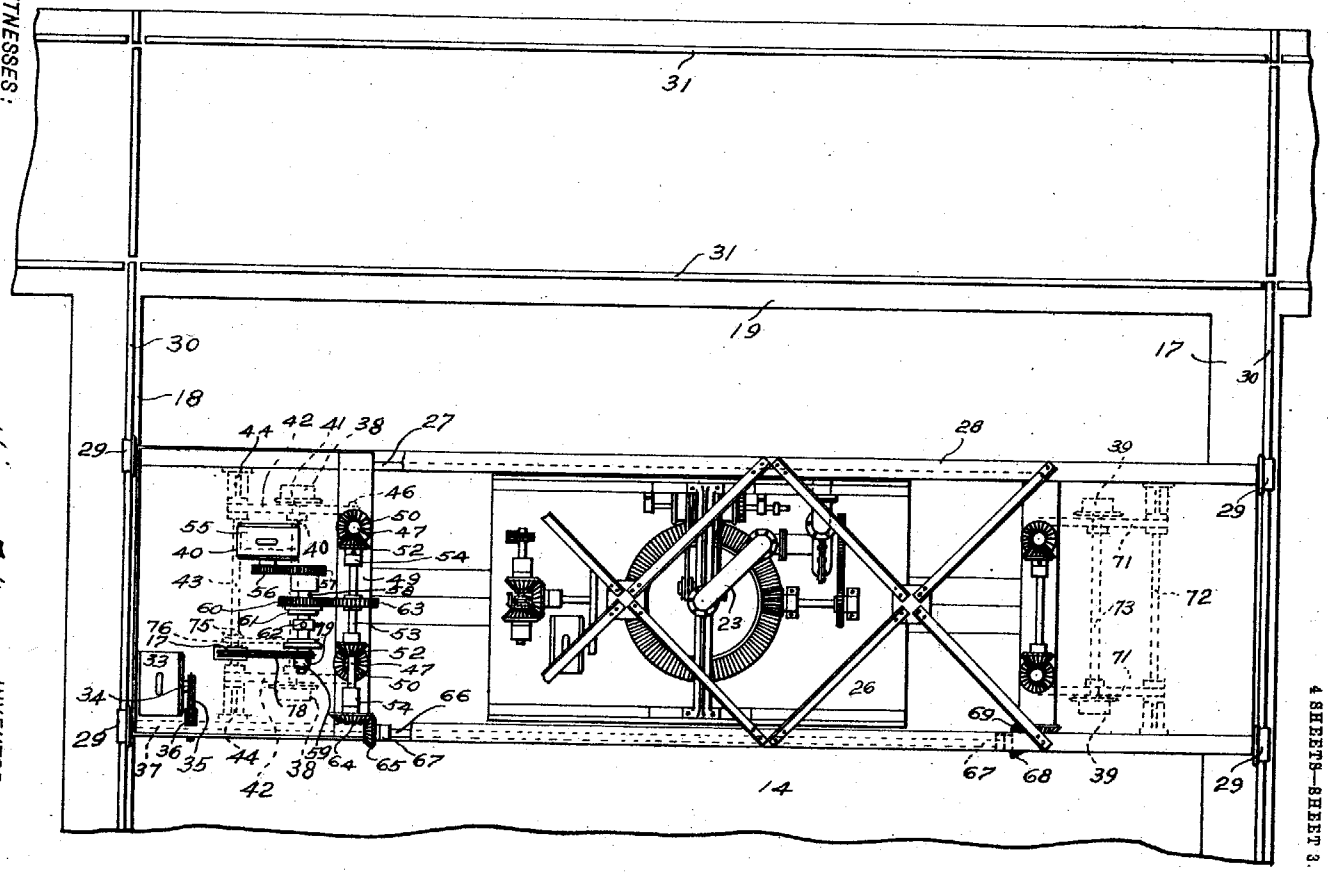
Figure 5:
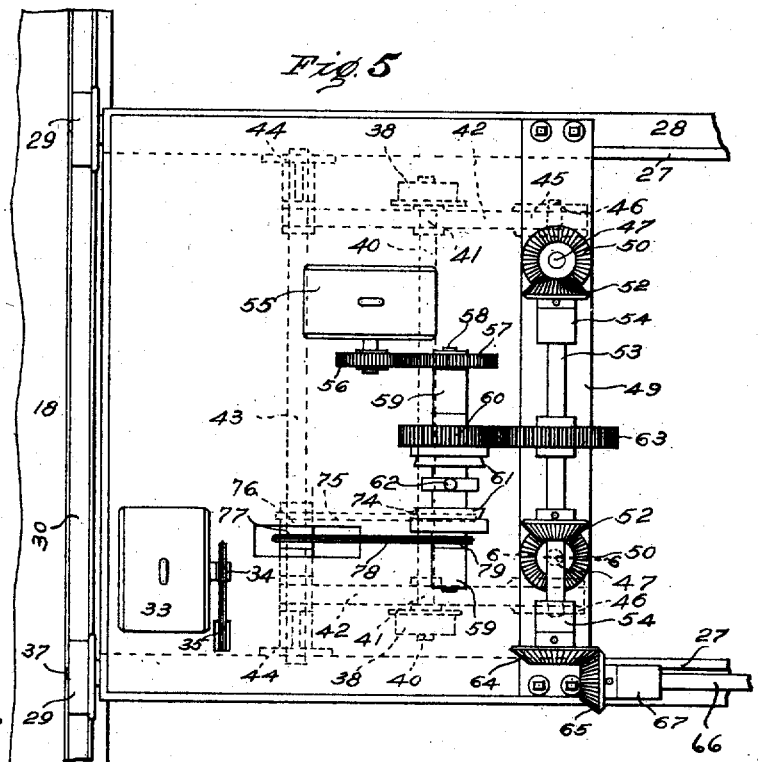
Figure 7:
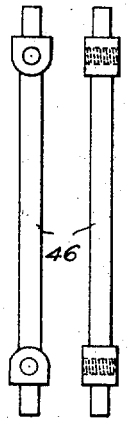
Figure 6:
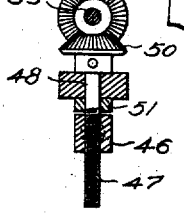
Figure 4:
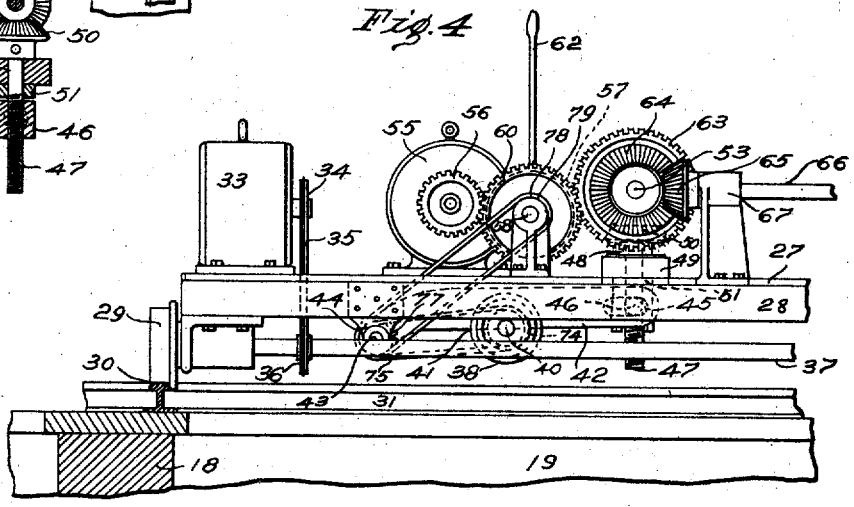

Figure 1 is a diagrammatic plan view illustrating a series of filter-beds consisting of three rows of said beds adjacent to each other, together with a plan view of a traveling structure adapted to travel lengthwise of said rows of filter-beds, and the longitudinal and transverse tracks upon which said structure is arranged to travel. Fig. 2 is an enlarged transverse section taken through one of the filter-beds on line 2 2 of Fig. 1, showing the traveling structure and one form of cleansing apparatus supported thereon, together with the mechanism by which said structure is propelled, the parts being broken away to save space in the drawings. Fig. 3 is a plan view of the parts shown in Fig. 2, together with a portion of the longitudinal and transverse tracks. Fig. 4 is a detail side elevation, partly in section, of a portion of the mechanism by which the carriage and the wheels attached thereto are raised from the longitudinal tracks in position to travel upon the transverse tracks. Fig. 5 is a plan view of the parts shown in Fig. 4. Fig. 6 is a detail vertical section taken on line 6 6 of Fig. 5, and Fig. 7 is a detail plan and side elevation of the non-rotary shaft 46.

Similar characters of reference designate corresponding parts throughout the several views.

Referring to the drawings, the reference character 10 designates a plurality of filter-beds, Fig. 1, shown as arranged in a plurality of rows 11, 12, and 13, each row having a number of separate filter-beds 14 14, 15 15, and 16 16, respectively, shown as extending lengthwise thereof, although this invention is in no manner limited to use with filter-beds of this particular arrangement, and such arrangement is only illustrated as an exemplification of the use of this invention. Each of the filter-beds, as 14, Figs. 2 and 3, is shown as embodying side walls 17 18, extending lengthwise of the filter-bed, and end walls 19 20, extending transversely thereof, and the surface of each filter-bed is shown as composed of sand 21, through which the water 22 passes or percolates and is purified by filtration.

The apparatus for cleaning the filter-beds preferably embodies a suction-pipe 23, upon the lower end of which is desirably supported and carried a frame 24, having a chamber 25 formed at each end thereof. The suction-pipe or other device 23 is preferably supported upon a supplementary traveling structure 26, constructed to travel upon tracks or ways 27, arranged lengthwise of the main traveling structure 28, and the latter may be provided with wheels 29, adapted to travel upon rails or ways 30, arranged lengthwise of the filter-beds. Any suitable motor or propelling mechanism may be provided upon the supplementary traveling structure 26 for the purpose of moving the same lengthwise of the main traveling structure 28 and transversely of the filter-beds, and suitable mechanism may be provided upon the supplementary traveling structure 26 to raise and lower the suction-pipe 23 and parts attached thereto, as will be readily understood.

The rails or ways 30 30 are arranged longitudinally of each row of filter-beds, and cross-rails 31 31 and 32 32 are arranged at each end of said rows of longitudinal rails for the purpose of permitting the transfer of the cleaning apparatus from one row of filter-beds to another of the same group, and the cleaning apparatus in entirety may be moved longitudinally of a row of filter-beds by an electric or other motor or propelling apparatus 33, preferably located upon the main traveling structure and carrying a fast sprocket-wheel 34, connected by a sprocket chain or gear 35 to a sprocket-gear 36, fast on the shaft 37, extending lengthwise of the main traveling structure 28 and having fast at each end thereof one of the supporting-wheels 29, adapted to travel on the longitudinal rails or ways 30. After the material of each filter-bed in the first row shall have been cleaned by the apparatus hereinbefore referred to the latter is raised by appropriate mechanism supported upon the supplementary traveling structure, and the cleaning apparatus in entirety is moved to one end or the other of the rails 30 30, whereupon the supporting-wheels 38 39, located preferably at the left and right, respectively, of the main traveling structure 28, Figs. 2 and 3, are lowered upon the transverse or cross rails or ways 31 or 32 by mechanism hereinafter described. The wheels 38 are carried by shaft 40, journaled in bearings 41 41 upon carrier-arms 42 42, preferably pivotally mounted on the shaft 43, desirably extending transversely of the carriage 28 and mounted in bearings 44 thereupon, and the carrier-arms 42 42 may extend beyond the wheels 38, Figs. 2, 3, 4, and 5, and may be slotted, as at 45, to receive the ends of a non-rotary shaft 46, said shaft 46, carrier-arms 42, and wheels 38 being preferably raised and lowered by means of vertical screw-threaded shafts 47, arranged to rotate in bearings 48 in a cross-frame 49 upon the main traveling structure 28.

The non-rotary shaft 46 may be screw-threaded to receive said shafts 47 47, each whereof carries a beveled gear 50, constructed to prevent said shafts 47 from moving lengthwise in relation to the cross-frame 49, while a fast collar 51 upon said shafts prevents the latter from moving upwardly in relation to said cross-frame. The screw-threaded shafts 47 are preferably rotated by means of beveled gears 50, meshing with a beveled gear 52, fast on a shaft 53, desirably extending transversely of the main traveling structure 28 and constructed to rotate in bearings 54 54 upon the cross-frame 49, and an electric motor or other driving apparatus 55 may rotate the shaft 53, said motor having a spur-gear 56, fast upon the driving-shaft thereof, which spur-gear meshes with a similar gear 57, fast to the shaft 58, mounted in bearings 59, and carrying a loose spur-gear 60, adapted to be locked to said shaft by means of a clutch 61, operated by a clutch-lever 62, and the spur-gear 60 meshes with a similar gear 63, fast to the shaft 53, substantially as illustrated.

The wheels 39 may be raised and lowered by means of a beveled gear 64, fast to the shaft 53 and meshing with a beveled gear 65, fast to the shaft 66, arranged to rotate in bearings 67 upon the main traveling structure 28, and at one end of the shaft 66 may be secured a beveled gear 68, meshing with a similar gear 69, fast on the shaft 70, which may be operatively connected by gearing arranged substantially as in the case of the wheels 38 to raise and lower the arms 71, pivotally connected to the shaft 72 and having a shaft 73 journaled to rotate thereon and to carry the wheels 39, as will be readily understood.

The operation of the mechanism hereinbefore described for effecting the transfer of the cleaning apparatus from the longitudinal rails or ways 30 to the transverse rails or ways 31 31 or 32 32 will be readily understood from the foregoing description when taken in connection with the accompanying drawings and the following explanation thereof.

The motor 55 having been set in motion rotates the gears 56 and 57 and the shaft 58. The clutch 61 is operated, by means of the clutch-lever 62, to lock the latter gear 60 to said shaft 58, whereby through the then fast gear 60 the gear 63 is rotated, together with the shaft 53, carrying the beveled gears, which impart motion to the several vertical shafts 47, thereby lowering the carrying-arms 42 and 71, together with the supporting-wheels 38 and 39, respectively, until said wheels come in contact with the transverse rails or ways 31 31 or 32 32, and upon a further descent of said wheels 38 and 39 the main structure 28 and superimposed parts will be elevated, and the supporting-wheels 29 will be raised from the longitudinal rails 30, as will be readily understood. The cleaning apparatus being now supported upon the supporting-wheels 38 and 39, resting upon the rails or ways 31 31 or 32 32, said apparatus may be propelled along the latter rails until brought in registering position with the next set of longitudinal rails 30 of the adjacent row of filter-beds, which propulsion may be effected by means of a sprocket-gear 74, connected by sprocket-chain 75 to sprocket-gear 76, loose upon the shaft 43, carrying another sprocket-gear 77, connected by a chain 78 to sprocket-gear 79, loose upon the shaft 58 and adapted to be temporarily secured thereto by clutch 61, operated by a clutch-lever 62. When the carriage has arrived at a proper position in relation to the rails or ways 30 30 of the succeeding row of filter-beds, the propelling mechanism may be stopped by moving the clutch-lever 62 in a direction opposite to that before taken, and the lifting mechanism before described is thrown into operation by reversing the electric motor 55 and throwing the clutch 61 into operation to lower the main traveling structure by raising the wheels 38 and 39 from the transverse rails or ways 31 31 and 32 32 and allowing said structure 28 to descend and the wheels 29 thereof to come in contact with the longitudinal rails 30 30 of the succeeding row of filter-beds.

It will be readily understood by those skilled in the art to which this invention appertains that the operation of propelling and transferring the cleaning apparatus along each row of filter-beds and from one row to another, respectively, will be repeated until each row of filter-beds in the group shall have been cleaned.

It is not desired to limit or confine this invention to the specific construction, combination, and arrangement of parts herein shown and described, and the right is reserved to make all such changes in and modifications of the same as come within the spirit and scope of the invention.

I claim—

1. A plurality of filter-beds, mechanism to remove impurities therefrom, a traveling structure supporting said mechanism and adapted to carry the same over said beds and means carried by said structure to transfer said structure and mechanism laterally from one of said beds to another.

2. A plurality of filter-beds, a traveling structure constructed to move thereover, mechanism upon said structure to remove impurities from said beds, means carried by said structure to transfer said structure and mechanism laterally from one of said beds to another and means for actuating the parts.

3. A plurality of filter-beds, ways thereon, a structure arranged to travel on said ways, mechanism for removing impurities from said beds mounted on said structure and means carried by said structure to transfer said structure and mechanism from one to another of said ways.

4. A plurality of filter-beds, ways thereon, a structure arranged to travel upon said ways, mechanism carried by said structure for removing impurities from said beds, ways arranged transversely of said first-mentioned ways and means carried by said structure to effect the transfer thereof from one to another of said ways.

5. A plurality of filter-beds, means for removing the impurities therefrom, a traveling structure supporting the latter and means carried by said structure to carry said structure and mechanism longitudinally of each of said filter-beds and transversely from one filter-bed to another.

6. A plurality of filter-beds, tracks extending longtiudinally thereof, a traveling structure constructed to be progressed over said tracks, mechanism upon said structure to remove impurities from said beds and means carried by said structure for effecting the transfer thereof from one set of longitudinal tracks to another.

7. A plurality of filter-beds, tracks extending longitudinally thereof, a traveling structure constructed to travel upon said tracks, mechanism upon said structure for removing impurities from said beds, transverse tracks and means to effect the transfer of said structure from said longitudinal to said transverse tracks.

8. A plurality of filter-beds, tracks extending longitudinally thereof, a traveling structure having wheels to travel upon said tracks, mechanism upon said structure to remove impurities from said beds, transverse tracks, instrumentalities upon said structure to effect the transfer thereof from said longitudinal to said transverse tracks.

9. A plurality of filter-beds, tracks extending longitudinally thereof, a traveling structure having wheels to travel upon said tracks, mechanism upon said structure to remove impurities from said beds, transverse tracks, wheels upon said structure arranged to travel upon said transverse tracks and means to operate said wheels.

10. A plurality of filter-beds, longitudinal tracks, a structure having wheels arranged to travel on said tracks, mechanism upon said structure to remove impurities from said beds, transverse tracks, wheels upon said structure arranged to travel on said transverse tracks and means to lower and raise said latter wheels into and out of contact respectively with said transverse tracks.

11. A plurality of filter-beds, longitudinal tracks, a structure carrying wheels to travel on said tracks, mechanism upon said structure to remove impurities from said beds, transverse tracks, wheels to travel upon the latter and means to lower said latter wheels into contact with said transverse tracks to raise said structure and disengage the first-mentioned wheels from said longitudinal tracks.

12. A plurality of filter-beds, longitudinal tracks, a structure carrying wheels arranged to travel on said tracks, mechanism on said structure to remove impurities from said beds, instrumentalities to propel said structure over said tracks, transverse tracks, wheels upon said structure to travel upon said latter tracks and means to effect the disengagement of the former wheels and the engagement of the latter wheels.

13. A plurality of filter-beds, longitudinal tracks, a structure having devices constructed to travel on said tracks, mechanism on said structure to remove the impurities from said beds, instrumentalities to propel said structure over said tracks, tracks extending transversely of said longitudinal tracks, wheels to travel on said transverse tracks, means to lower said wheels into contact with said transverse tracks and instrumentalities to propel said structure over said transverse tracks In testimony whereof I have signed my name to this specification, in the presence of two subscribing witnesses, at Los Angeles, county of Los Angeles, State of California, this 15th day of September, 1903.

HIRAM WHEELER BLAISDELL.

Witnesses:
H. C. MILLSAP,
MIGNON FORD.